United States Patent [19]

Brignall

[11] 4,154,156
[45] May 15, 1979

[54] TORTILLA HOLDER

[76] Inventor: Clifford N. Brignall, 268 Lakeshore Rd., Boulder City, Nev. 89005

[21] Appl. No.: 866,643

[22] Filed: Jan. 3, 1978

[51] Int. Cl.² ............................................ A47J 43/18
[52] U.S. Cl. ................................................... 99/426
[58] Field of Search .................. 99/426, 394, 402, 403, 99/409; 16/119, 120, 125, 126; 220/95, 96

[56] References Cited

U.S. PATENT DOCUMENTS

| 2,775,929 | 1/1957 | Johnson | 99/426 |
| 2,847,933 | 8/1958 | Pate | 99/426 |
| 2,957,404 | 10/1960 | Richardson | 99/426 |
| 3,332,340 | 7/1967 | Wirtz | 99/426 |

Primary Examiner—Edward J. McCarthy
Attorney, Agent, or Firm—Fulwider, Patton, Rieber, Lee & Utecht

[57] ABSTRACT

A holder for forming and cooking a tortilla within a frying pan. The holder includes an apertured plate of generally U-shaped transverse configuration upon the exterior surfaces of which is removably clipped a tortilla. A handle is slidably connected to a pair of bars that connect the outer ends of the plate. The handle slides relative to the bars when the plate is inverted during a tortilla cooking operation to clear the sides of the frying pan.

6 Claims, 5 Drawing Figures

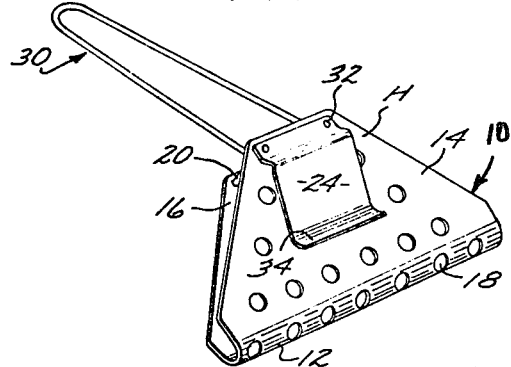
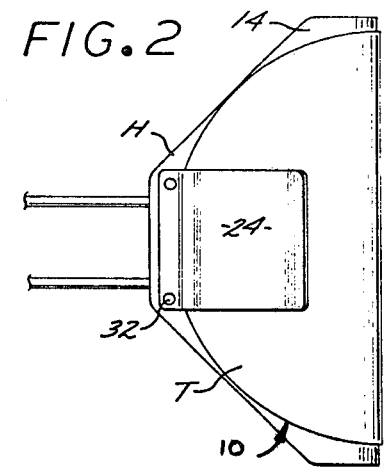
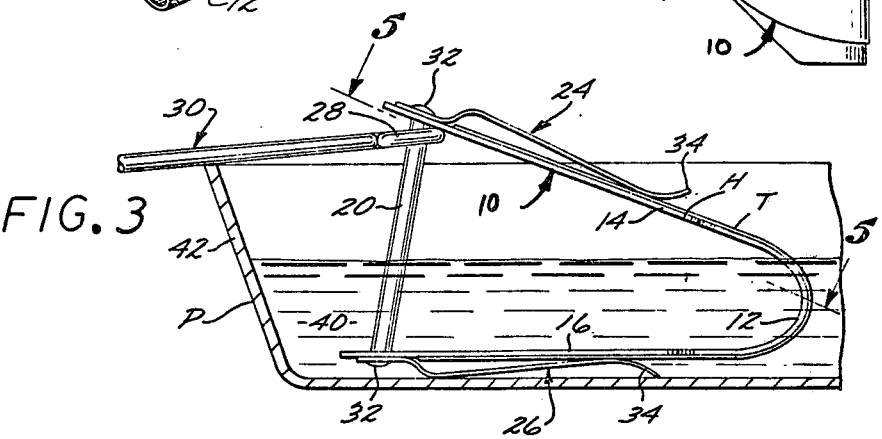
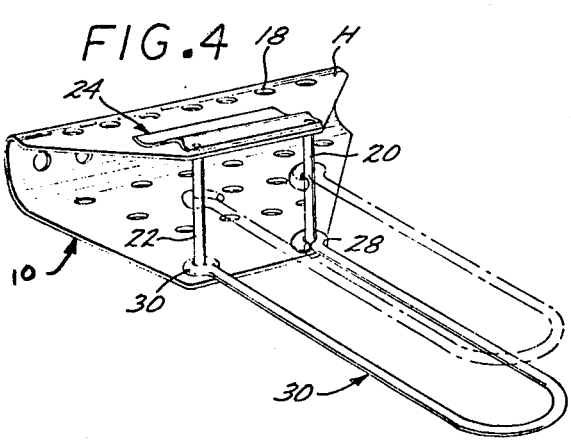
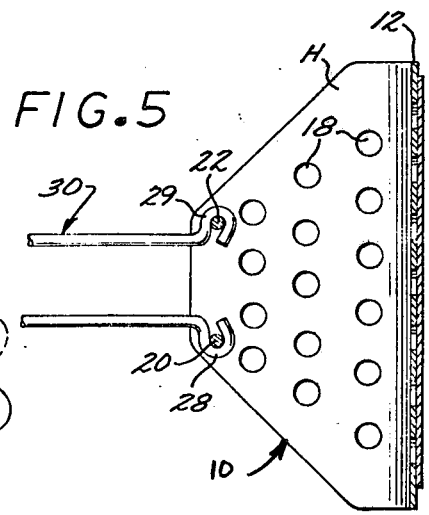

TORTILLA HOLDER

BACKGROUND OF THE INVENTION

In the preparation of tacos, a type of Latin-American dish in some ways related to a sandwich, it is necessary to bend a tortilla about its diameter to a generally U-shaped configuration, and to fry this tortilla in this configuration so that it becomes a crisp and edible shell. It is possible to fry a tortilla in this general shape using a common type pan, such as the skillet, and using a hand-manipulated instrument such as a fork. This general type of procedure is somewhat disadvantageous for several reasons. One of these is that it is comparatively difficult to adequately hold a tortilla to its desired final shape during the frying operation. Another disadvantage of this essentially manual procedure is that an individual carrying out the process of frying the tortilla is apt to become burned with splattering grease or the like. It is also comparatively difficult to remove the cooked taco shell from a pan once the frying operation has been completed.

In order to simplify the frying of tortillas for tacos a number of different types of tortilla holders have been heretofore developed. These devices tend to be undesirable because of a number of different factors. Frequently these devices are comparatively complex and, hence, are comparatively expensive when sold. Also, frequently these tortilla holders are mechanically somewhat complex to operate. The average individual preparing tacos desires to use a tortilla holder which is as simple to operate as possible. Further, many of the prior tortilla holders are disadvantageous because of problems pertaining to the manner in which a tortilla is held in place with them, and pertaining to the manner in which a tortilla is removed from them while the tortilla itself is exceedingly hot immediately following the frying operation.

Another disadvantage of the prior tortilla cooking and forming devices is that they generally require frying in a deep-sided pan. While deep-fat frying is entirely practical in commercial establishments where the volume warrants the use of deep-fat frying apparatus, quite often it is desirable to prepare the tortillas into taco shells in a much smaller scale, such as in the home.

BRIEF DESCRIPTION OF THE INVENTION

It is a major object of the present invention to provide a holder for forming and cooking a tortilla within a comparatively shallow-sided pan thereby requiring a minimum amount of cooking oil.

Another object of the present invention is to provide a tortilla holder of the above-described nature which is simple of design and rugged of construction whereby it may be manufactured at low cost and yet will provide a long and troublefree service life.

Yet a further object of the present invention is to provide a tortilla holder of the above-described nature wherein a tortilla may be quickly and easily positioned for cooking and forming and yet with such tortilla being readily removed from the holder after the cooking and forming thereof.

A more particular object of the present invention is to provide a tortilla holder of the above-described nature utilizing a generally U-shaped plate upon which is clipped a tortilla, with such plate being provided with a generally vertically slidable handle which is movable relative to the sides of a cooking pan as the holder is inverted relative to the pan. This arrangement permits the tortilla to be cooked in two stages, the holder being inverted after the first half of the tortilla has been cooked whereby the second half may be cooked.

These and other objects and advantages of the present invention will become apparent from the following detailed description of a preferred embodiment of the invention, when taken in conjunction with the appended drawings.

BRIEF DESCRIPTION OF THE DRAWINGS

FIG. 1 is a front perspective view showing a preferred form of tortilla holder embodying the present invention;

FIG. 2 is a broken top plan view of said tortilla holder with a tortilla affixed thereto for cooking;

FIG. 3 is a vertical sectional view taken in enlarged scale through a frying pan within which is positioned the tortilla holder of FIGS. 1 and 2;

FIG. 4 is a rear perspective view showing how the handle of said tortilla holder is generally vertically movable; and FIG. 5 is a broken sectional view taken on line 5—5 of FIG. 3.

DESCRIPTION OF THE PREFERRED EMBODIMENT

Referring to the drawings, a preferred form of tortilla holder H embodying the present invention includes a sheet metal plate generally designated 10 that is of generally U-shaped transverse configuration so as to have a central bend 12 rearwardly from which extend a pair of side portions 14 and 16. The plate 10 is formed over its surface with a plurality of apertures 18. A pair of generally vertically extending bars 20 and 22 of like construction rigidly interconnect the outer or rear ends of the side portions 14 and 16 remote from bend 12. A generally horizontally extending handle, generally designated 30, is slidably secured at one of its ends to the bars 20 and 22. A pair of like clips, generally designated 24 and 26, are secured upon the exterior surfaces of plate 10 to removably retain a tortilla T on the plate 10 during a cooking operation.

More particularly, handle 30 is defined by a generally U-shaped rod, the free ends of which are formed with loops 28 and 29. The dimensions of the bars 20 and 22 relative to the loops 28 and 29 are so selected that the handle 30 will freely slide in a generally vertical direction along bars 20 and 22.

Each clip 24 and 26 is formed of sheet metal and is resilient in nature. The opposite outer ends of each clip are rigidly secured to the opposite ends of bars 20 and 22 as by means of rivets 32. The clips are seen to extend from their point of connection to bars 20 and 22 along the plate side portions 14 and 16 with such clips being curved away from side portions 14 and 16 adjacent rivets 32 and then sloping inwardly along the length of such side portions to a curved entry lip 34 at the free ends of such clips. A tortilla T may be readily positioned upon the exterior surfaces of the plate side portions by moving the free ends of the clips 24 and 26 away from plate side portions 14 and 16 as indicated in FIGS. 2 and 3. The resiliency of the clips will securely retain the uncooked tortilla T upon plate 10.

In utilizing the aforedescribed tortilla holder H for cooking and forming a tortilla T, a frying pan P containing hot cooking oil 40 is utilized, as shown in FIG. 3. It should be particularly noted that the sides 42 of the frying pan may be comparatively shallow. Referring now to FIG. 3, the plate 10 to which is secured the uncooked tortilla T is lowered into the cooking oil 40 so that such oil covers at least the lower half of the uncooked tortilla. At this time, the handle 30 will be disposed at the upper portion of bars 20 and 22 with the intermediate portion of the handle resting upon the upper edge of pan side 42. With continued reference to FIG. 3, it will be noted that entry lip 34 of the lower clip 28 rests upon the bottom of pan P so as to prevent contact of tortilla T with such pan bottom thereby avoiding scortching of the tortilla. The tortilla holder H will support itself in the position of FIG. 3 as the lower portion of the tortilla is cooked. Apertures 18 provide ready access of the cooking oil 40 to the inside surface of the tortilla. Thereafter, the tortilla holder H is inverted so as to deposit the uncooked upper portion of the tortilla within the cooking oil 40. It should be particularly noted that the handle loops 28 and 29 will vertically slidably move along bars 20 and 22 so as to clear the upper edge of pan side 42. This permits the tortilla T to be cooked in a pan P of reduced size thereby requiring a minimum amount of cooking oil. After the previously uncooked portion of the tortilla has been cooked, the handle 30 will be utilized to lift the plate 10 and its attached tortilla out of the pan P. Thereafter, the cooked and formed tortilla may be readily removed from the plate 10, such tortilla being pulled out from the clips 24 and 26 as by means of a fork. The tortilla holder H is then ready to receive a second tortilla for cooking and forming into a taco shell.

Various modifications and changes may be made with respect to the foregoing detailed description without departing from the spirit of the present invention.

I claim:

1. A holder for forming and cooking a tortilla within a pan, said holder comprising:
    an apertured plate that is of generally U-shaped transverse configuration so as to have a central bend from which extend a pair of side portions;
    generally vertically extending bar means rigidly interconnecting the outer ends of said side portions remote from said bend;
    a generally horizontally extending handle having attachment means at one of its ends to that slidably engage said bar means whereby said handle may freely move along said bar means when said plate is inverted relative to said pan; and
    clip means on the exterior of said plate to removably retain a tortilla on the exterior of said plate during a cooking operation.

2. A tortilla holder as set forth in claim 1, wherein: said bar means consist of a pair of bars.

3. A tortilla holder as set forth in claim 2, wherein: said attachment means comprise a pair of loops that slidably encircle said bars.

4. A tortilla holder as set forth in claim 2, wherein: fastening means extend through said clips into the opposite ends of said bars.

5. A tortilla holder as set forth in claim 3, wherein: said handle is defined by a generally U-shaped rod, with said loops being formed on the free ends thereof.

6. A tortilla holder as set forth in claim 5, wherein: fastening means extend through said clips into the opposite end of said bars.

* * * * *

UNITED STATES PATENT AND TRADEMARK OFFICE
CERTIFICATE OF CORRECTION

PATENT NO. : 4,154,156

DATED : May 15, 1979

INVENTOR(S) : CLIFFORD N. BRIGNALL

It is certified that error appears in the above-identified patent and that said Letters Patent are hereby corrected as shown below:

Claim 1, line 14, delete "to".

Signed and Sealed this

Twenty-ninth Day of January 1980

[SEAL]

Attest:

SIDNEY A. DIAMOND

Attesting Officer     Commissioner of Patents and Trademarks